United States Patent
Childress et al.

(10) Patent No.: US 7,756,931 B2
(45) Date of Patent: Jul. 13, 2010

(54) METHOD AND APPARATUS FOR MANAGER/AGENT COMMUNICATIONS

(75) Inventors: Rhonda L. Childress, Austin, TX (US); Ward K. Harold, Austin, TX (US); David Bruce Kumhyr, Austin, TX (US); Reid Douglas Minyen, Lakeway, TX (US); Neil R. Pennell, Cedar Creek, TX (US)

(73) Assignee: International Business Machines Corporation, Armonk, NY (US)

( * ) Notice: Subject to any disclaimer, the term of this patent is extended or adjusted under 35 U.S.C. 154(b) by 1007 days.

(21) Appl. No.: 10/976,281

(22) Filed: Oct. 28, 2004

(65) Prior Publication Data

US 2006/0095519 A1 May 4, 2006

(51) Int. Cl.
*G06F 15/16* (2006.01)
(52) U.S. Cl. .................. 709/206; 709/217; 709/227
(58) Field of Classification Search .............. 709/206, 709/227, 203, 217
See application file for complete search history.

(56) References Cited

U.S. PATENT DOCUMENTS

| | | | | |
|---|---|---|---|---|
| 6,295,518 B1 * | 9/2001 | McLain et al. | ............... | 703/23 |
| 6,621,827 B1 | 9/2003 | Rezvani et al. | ............... | 370/449 |
| 7,024,474 B2 * | 4/2006 | Clubb et al. | ............... | 709/223 |
| 7,051,119 B2 * | 5/2006 | Shafron et al. | ............... | 709/248 |
| 7,328,243 B2 * | 2/2008 | Yeager et al. | ............... | 709/205 |
| 7,359,943 B2 * | 4/2008 | Szeto et al. | ............... | 709/206 |
| 2002/0010803 A1 | 1/2002 | Oberstein et al. | ........... | 709/318 |
| 2002/0046299 A1 | 4/2002 | Lefeber et al. | ............... | 709/318 |
| 2002/0095399 A1 | 7/2002 | Devine et al. | ................... | 707/1 |
| 2003/0014479 A1 | 1/2003 | Shafron et al. | | |
| 2003/0149759 A1 | 8/2003 | Hetherington et al. | ........ | 709/223 |
| 2003/0188040 A1 | 10/2003 | Vincent | ..................... | 709/317 |
| 2003/0191590 A1 | 10/2003 | Narayan et al. | ............... | 702/68 |
| 2004/0030741 A1 | 2/2004 | Wolton et al. | ............... | 709/202 |
| 2004/0039794 A1 * | 2/2004 | Biby et al. | ................. | 709/217 |
| 2004/0078800 A1 | 4/2004 | Manzano | .................... | 719/313 |
| 2004/0083479 A1 | 4/2004 | Bondarenko et al. | ........ | 719/310 |
| 2004/0088571 A1 | 5/2004 | Jerrim et al. | ................ | 713/201 |
| 2004/0093387 A1 * | 5/2004 | Wick | ........................ | 709/207 |
| 2004/0098729 A1 | 5/2004 | Husain et al. | ................ | 719/314 |
| 2005/0102382 A1 | 5/2005 | MacGregor et al. | | |
| 2006/0129643 A1 * | 6/2006 | Nielson et al. | ............... | 709/206 |

FOREIGN PATENT DOCUMENTS

WO  02097651 A1  12/2002

OTHER PUBLICATIONS

U.S. Appl. No. 10/976,255, Childress et al., Method And Apparatus To Correlate System Management Information Using Instant Messaging Facilities.

* cited by examiner

*Primary Examiner*—Ario Etienne
*Assistant Examiner*—El Hadji M Sall
(74) *Attorney, Agent, or Firm*—Yee & Associates, P.C.; Jeffrey S. LaBaw

(57) ABSTRACT

A method, apparatus, and computer instructions for programmatic communications via an instant messaging network. A connection is established to the instant messaging network. A script is received though the connection. The script is then executed.

19 Claims, 3 Drawing Sheets

METHOD AND APPARATUS FOR MANAGER/AGENT COMMUNICATIONS

CROSS REFERENCE TO RELATED APPLICATION

The present invention is related to an application entitled Method And Apparatus To Correlate System Management Information Using Instant Messaging Facilities, Ser. No. 10/976,255, filed Oct. 28, 2004, assigned to the same assignee, and incorporated herein by reference.

BACKGROUND OF THE INVENTION

1. Technical Field

The present invention relates generally to an improved data processing system and in particular to a method and apparatus for processing data. Still more particularly, the present invention relates to a method, apparatus, and computer instructions for facilitating communications between components.

2. Description of Related Art

A virtual enterprise may provide various services within an organization or to users on the Internet. A virtual enterprise is a business entity constructed from organizationally and geographically distributed units or groups. For example, a company, such as International Business Machines Corporation, has various microelectronics providers and independent resellers. The company along with these providers and resellers forms a virtual enterprise if a system is implemented to integrate key business systems with participating business units from these different companies. In providing these services, the proper functioning of components across the enterprise is essential. These other components include, for example, servers, routers, printers, gateways, and firewalls. A failure in one or more of these components may result in an inability to provide the services that are expected by users or customers of the virtual enterprise. All of these components are found in a network data processing system, which may have various sizes depending on the enterprise. Additionally, these components may be located in diverse geographic locations. As a result, management information about all of these components must be collected.

The system management information about the components are correlated and analyzed to access the performance and availability of a particular service being provided by the virtual enterprise. System management information is the information needed to monitor and manage a specific component in a data processing system. The information collected may include information with respect to loading or requests being made to various components. Further, this management information also may include, for example, status information about the availability of resources within a particular component. These resources may include available processing power, available memory, and available storage space on hard disk drives.

This information may be collected in many different ways. For example, many systems include agents that collect and send information regarding components through specialized and proprietary protocols. Traditional remote invocation processes for communicating with management agents are constrained by the interfaces and objects exposed by the agent. Extending and/or upgrading these interfaces and objects is time consuming. Additionally, these extensions or upgrades may be incompatible with older clients or devices.

Therefore, it would be advantageous to have an improved method, apparatus, and computer instructions for communications with agents.

SUMMARY OF THE INVENTION

The present invention provides a method, apparatus, and computer instructions for programmatic communications via an instant messaging network. A connection is established to a remote agent via an instant messaging network. The remote agent receives a script though the connection. The script is then executed by the remote agent and the result is transmitted back to the requester.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
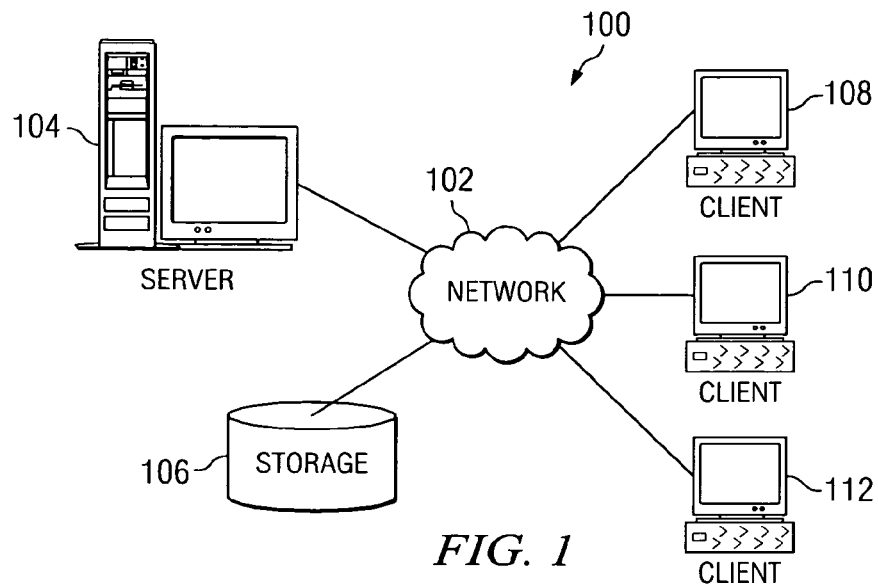
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
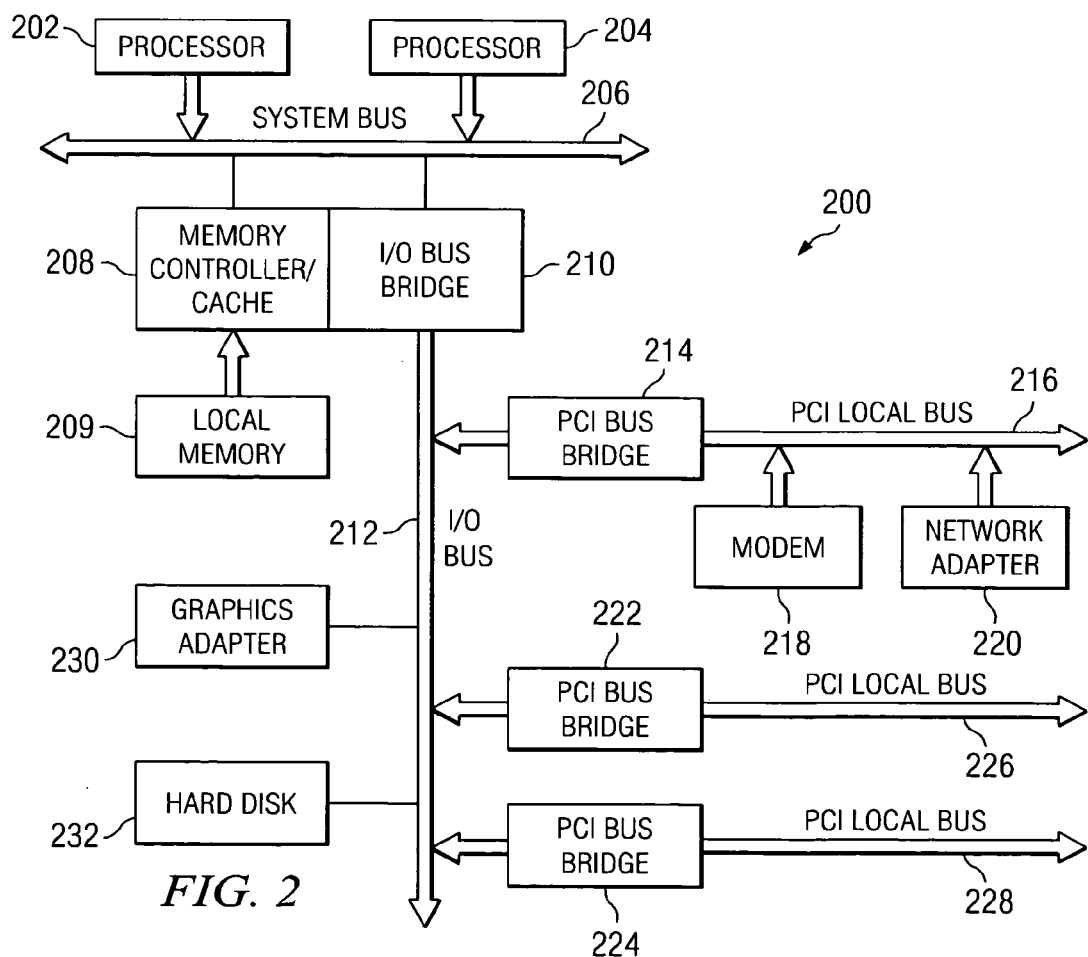
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
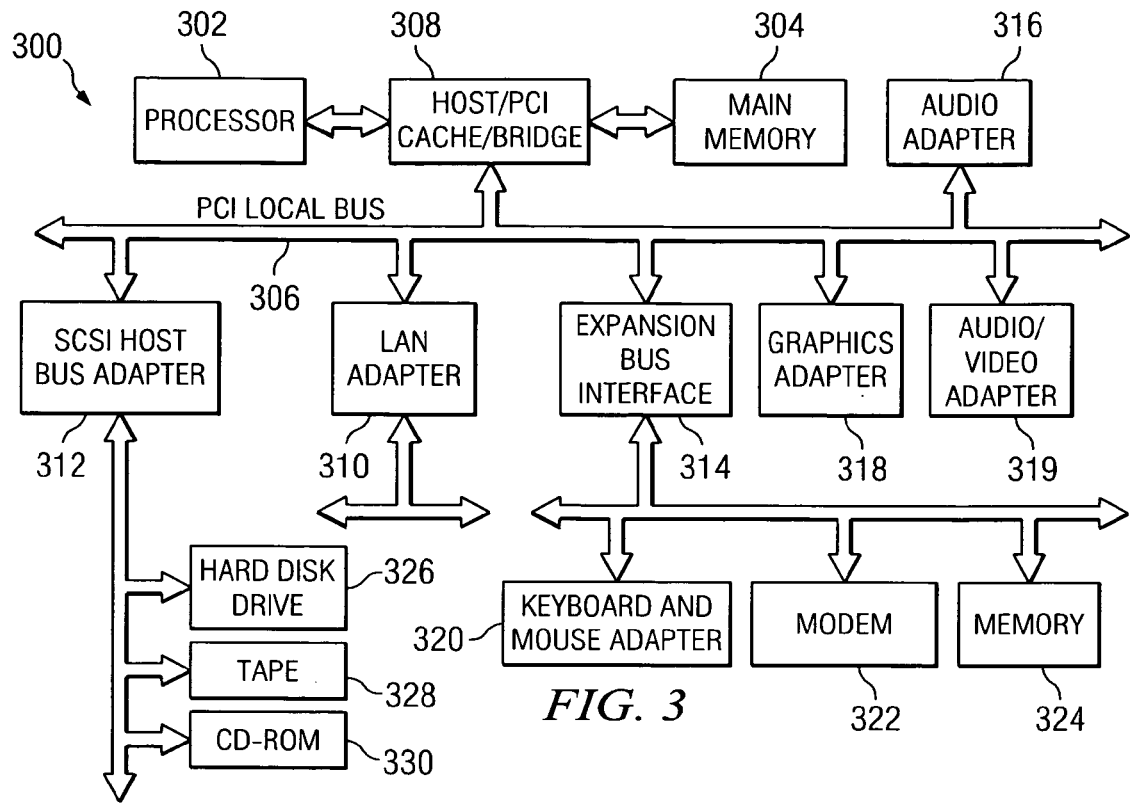
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards. In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance. The present invention provides an improved method, apparatus, and computer instructions for facilitating communications between management agents and other components in a system management environment. In particular, the present invention provides for programmatic communications through an instant messaging network. Programmatic communications is an exchange of messages between one or more computer programs without direct human intervention as opposed to an exchange of messages interactively driven by a human. The mechanism of the present invention uses an instant messaging system to exchange information and script execution engines to process information. A script execution engine is embedded within an agent that connects to an instant messaging system. In this manner, other agents or components, such as remote management programs, may engage in conversations with the management agent. As used herein, a conversation includes script commands or programs and their subsequent responses.

In these examples, a management agent is a program that monitors a resource to collect system management information. The core of the management agent includes a script execution engine. The management agent is given an identity in an instant messaging system and the ability to login automatically. Remote managers or other agents communicate with the management agent by creating a "chat session" with the agent. The chat consists of an exchange of script command/programs and their subsequent responses. In these illustrative examples, traditional instant messaging clients can be used to interface with management agent or a custom graphical user interface (GUI) can be created that hides the text of the commands/programs being sent to the agent.

Figure 4:
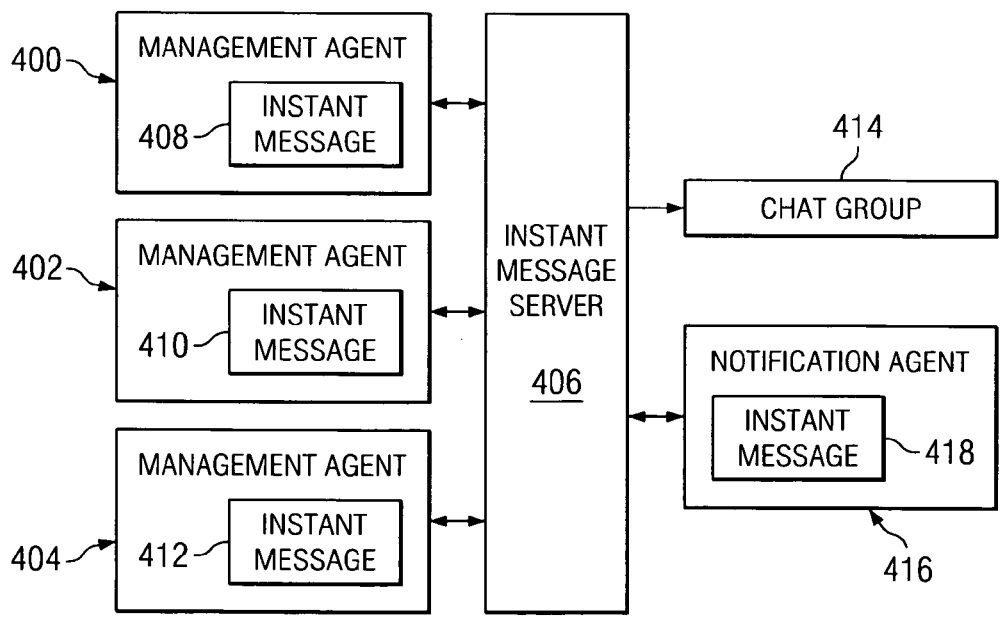
FIG. 4 is a diagram illustrating components used in accessing system management information in accordance with a preferred embodiment of the present invention.

With reference now to FIG. 4, a diagram illustrating components used in accessing system management information is depicted in accordance with a preferred embodiment of the present invention. In this example, management agents 400, 402, and 404 are present. These management agents send system management information to instant messaging (IM) server 406. Depending on the particular type of instant messaging system, the instant messaging agents may send instant messages to each other directly once logging in with instant message server 406.

These management agents monitor components, such as servers, gateways, and network attached storage systems. Information collected by these management agents are sent to instant messenger 406 through instant messaging processes that are incorporated within the agents. In these examples, management agent 400 contains instant messaging (IM) process 408, management agent 402 contains instant messaging (IM) process 410, and management agent 404 contains instant messaging (IM) process 412. These instant messaging agents use protocols implemented in currently available instant messaging programs that are used by human users. The instant messaging processes in these management agents log on to instant messaging server 406 and send information to a particular chat group, such as chat group 414. This chat group may include a number of management agents that are designated for receiving system management information.

Notification agent 416 contains instant messaging process 418. Notification agent 416 logs on to instant messaging server 406 through instant messaging process 418. This particular component monitors system management information sent to chat group 414. In particular, notification agent 416 collects the system management information sent to chat group 414 by management agents 400, 402, and 404. This information is gathered from chat group 414 through instant messaging process 418 in notification agent 416.

This notification agent may then correlate the information and initiate necessary actions depending on the particular implementation. Alternatively, notification agent 416 may collect system management information from chat group 414 and send this information to another program for analysis.

Management agents 400, 402, and 404 include script execution engines that are used in communicating with other agents and devices. Notification agent 416 also may include a script execution engine.

Figure 5:
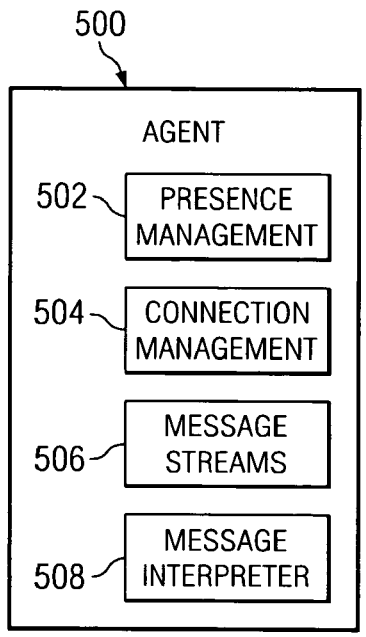
FIG. 5 is an example of an agent in accordance with a preferred embodiment of the present invention.

With reference next to FIG. 5, an example of an agent is depicted in accordance with a preferred embodiment of the present invention. Agent 500 is an example of an agent, such as management agent 400 in FIG. 4. Agent 500 includes presence management 502, connection management 504, message streams 506, and message interpreter 508.

Presence management 502 connects and logs agent 500 onto an instant messaging system. This component also knows the password to logon and manages state changes. For example, presence management 502 may generate an indication of the state or status as being unavailable or offline. Connection management 504 is employed when agent 500 is logged on to the instant messaging system. This component decides how to handle incoming messages. For example, connection management 504 decides from which components messages will be accepted. Presence management 502 and connection management 504 contain the instant messaging processes for agent 500.

Message streams 506 represent the input/output stream and may contain, for example, messages from remote components. These components include, for example, scripts and responses. Message interpreter 508 takes the form of a script engine in this example. Message interpreter 508 receives script commands or programs and executes the instructions.

Figure 6:
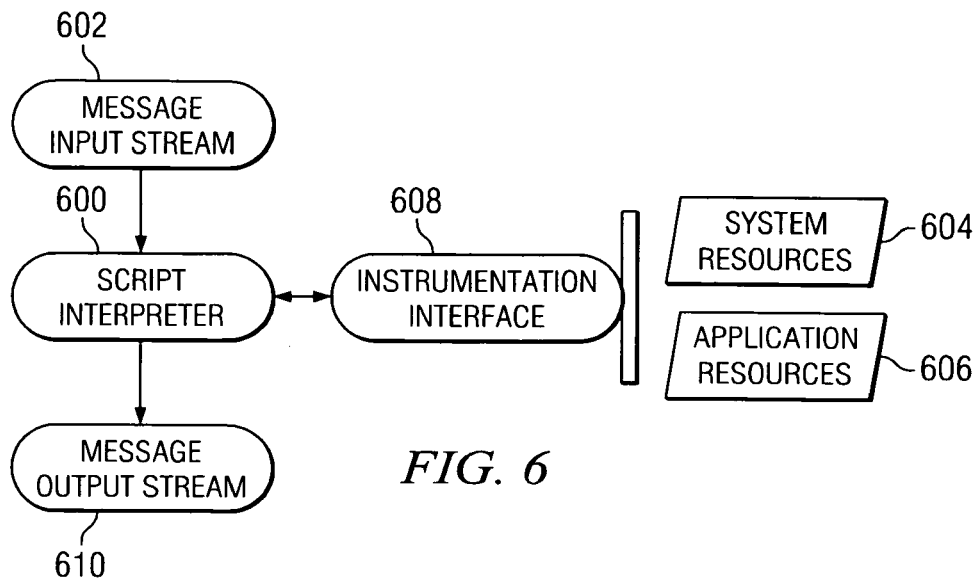
FIG. 6 is a diagram illustrating the use of a script engine in accordance with a preferred embodiment of the present invention.

Turning to FIG. 6, a diagram illustrating the use of a script engine is depicted in accordance with a preferred embodiment of the present invention. Script interpreter 600 is a component in an agent, such as agent 500 in FIG. 5. More specifically, script interpreter 600 may be implemented as message interpreter 508 in FIG. 5.

Script interpreter 600 receives message input stream 602. This input stream contains instructions that are recognized by script interpreter 600. In this illustrative example, message input stream 602 contains a script for monitoring a component or device. In particular, system resources 604 and application resources 606 are the components for which monitoring occurs. Script interpreter 600 sends appropriate commands and/or instructions to instrumentation interface 608 to monitor these resources. Java management extensions (JMX) for software components are used to implement instrumentation interface 608 in these examples.

In response to obtaining information regarding system resources 604 and application resources 606 through instrumentation interface 608, script interpreter 600 generates a response for message output stream 610. This response may include data obtained from monitoring system 604 and application resources 606. This information includes system management information regarding the monitored resources. This information may be correlates and analyzed to manage these and other resources. This information along with system management information collected by other agents is used to manage networks and business enterprises.

Figure 7:
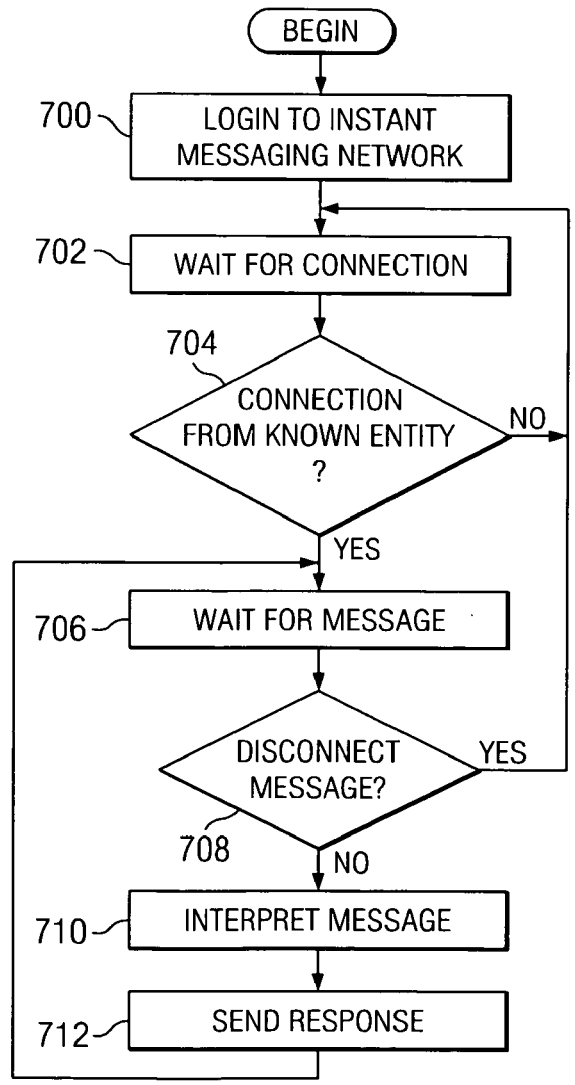
FIG. 7 is a flowchart of a process for handling a script in accordance with a preferred embodiment of the present invention.

Next in FIG. 7, a flowchart of a process for handling a script is depicted in accordance with a preferred embodiment of the present invention. The process illustrated in FIG. 7 may be implemented in message interpreter 508 in FIG. 5.

The process begins by logging into an instant messaging network (step 700). Thereafter, the process waits for a request for a connection (step 702). When a connection request is received, a determination is made as to whether the request is from a known entity (step 704). The agent may accept a connection from a limited number of entities. This determination may be made through comparing the identity of the entity requesting a connection with a list or table of entrees for which connections are accepted.

If the request for the connection is from a known entity, the process waits for a message from that entity (step 706). In these examples, the message received takes the form of a script. This script may be, for example, a command or a program.

When a message is received, a determination is made as to whether the message is a disconnect message (step 708). If the message is not a disconnect message, the received message is interpreted (step 710). In interpreting the message, various actions may be initiated by the interpreter. For example, data or statistics regarding a component may be gathered. Alternatively, a script may cause the initiation of a process on the component, such as resetting or restarting the component. Thereafter, a response is sent back to the entity sending the message (step 712). With the process then returning to step 706 as described above. The response may take various forms. For example, a response may be merely an acknowledgement that the message had been processed. In other examples, a response may include data or statistics obtained from the component.

With reference again to step 708, if the message is a disconnect message, the process returns to step 702 to wait for a connection. With reference again to step 704, if the connection is not from a known entity, the process also returns to step 702.

Thus, the present invention provides an improved method, apparatus, and computer instructions for managing communications using an interpreter, such as a script engine. In these examples, the script takes the form of Java script. Of course, other types of scripts may be used depending on the implementation. The agent logs onto an instant messaging system and communicates with other components through a connection in the form of a chat session. The communication takes the form of receiving scripts and returning responses.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for automatic programmatic communications via an instant messaging network, the method comprising steps implemented by the data processing system of:

establishing a connection to the instant messaging network;

responsive to establishing the connection to the instant messaging network, automatically receiving a programmatic communication through the connection to the instant messaging network without user intervention, wherein the programmatic communication is a script originating from the instant messaging network;

responsive to automatically receiving the programmatic communication, automatically executing, by a script engine of the data processing system, the script originating from the instant messaging network to obtain component status information for a component accessible by the data processing system, wherein the script is automatically received from a management agent that remotely monitors the component using the instant messaging network to generate system management information for use in managing the resource; and returning a response to the management agent after automatically executing the script by the script engine, wherein the response is returned to a chat session that the management agent belongs to; wherein the script engine is located in an agent, wherein the agent is a computer process that logs on to the instant messaging network.

2. The method of claim 1, wherein the automatically executing step includes:

executing a program in the script by the script engine.

3. The method of claim 1, wherein the agent automatically logs on to the instant messaging network and establishes a chat session with another agent without user intervention using the connection to the instant messaging system, wherein another script engine is located in the another agent.

4. The method of claim 3, wherein the establishing step, the receiving step, and the executing step are performed by the agent.

5. A system management environment comprising:

a centralized manager, wherein the centralized manager connects to an instant messaging system; and a set of agents, wherein each agent has an agent script execution engine used to connect to the instant messaging system, wherein the centralized manager sends script programs to the set of agents through the instant messaging system, the set of agents automatically execute the script programs using the agent script execution unit to monitor resources, and the set of agents return responses to the centralized manager indicating status of the resources after each respective agent of the set of agents automatically executes a respective one of the script programs, wherein each respective response from each respective agent is returned to a chat session that the respective agent belongs to, wherein the centralized manager generates system management information for use in remotely managing the resources, wherein the centralized manager communicates with the set of agents through a chat session of the instant messaging system to send the script programs to the set of agents without user intervention, and wherein each of the set of agents are a member of a same chat group that is used by the centralized manager when sending the script programs to the set of agents without user intervention.

6. A data processing system for automatic programmatic communications via an instant messaging network, the data processing system comprising:

establishing means for establishing a connection to the instant messaging network;

receiving means, responsive to establishing the connection to the instant messaging network, for automatically receiving a programmatic communication through the connection to the instant messaging network without user intervention, wherein the programmatic communication is a script originating from the instant messaging network;

executing means, responsive to automatically receiving the programmatic communication, for automatically executing the script to obtain component status information for a component accessible by the data processing system, wherein the script is automatically received from a management agent that remotely monitors the component using the instant messaging network to generate system management information for use in managing the resource, wherein the executing means is a script engine; and returning means for returning a response to the management agent after automatically executing the script by the script engine, wherein the response is returned to a chat session that the management agent belongs to; wherein the script engine is located in an agent, wherein the agent is a computer process that logs on to the instant messaging network.

7. The data processing system of claim 6, wherein the executing means includes:

means for executing a program in the script by the script engine.

8. The data processing system of claim 6, wherein the agent automatically logs on to the instant messaging network and establishes a chat session with another agent without user intervention using the connection to the instant messaging system, wherein another script engine is located in the another agent.

9. The data processing system of claim 8, wherein the establishing means, the receiving means, and the executing means are located in the agent.

10. A computer readable, recordable-type medium encoded with a computer program product and operable by a data processing system for automatic programmatic communications via an instant messaging network, the computer program product comprising:

first instructions for establishing a connection to the instant messaging network;

second instructions, responsive to establishing the connection to the instant messaging network, for automatically receiving a programmatic communication through the connection to the instant messaging network without user intervention, wherein the programmatic communication is a script originating from the instant messaging network;

third instructions, responsive to automatically receiving the programmatic communication, for automatically executing the script originating from the instant messaging network to obtain component status information for a component accessible by the data processing system, wherein the script is automatically received from a management agent that remotely monitors the component using the instant messaging network to generate system management information for use in managing the resource; and fourth instructions for returning a response to the management agent after automatically executing the script by the script engine, wherein the response is returned to a chat session that the management agent belongs to; wherein the script engine is located in an agent, wherein the agent is a computer process that logs on to the instant messaging network.

11. The computer program product of claim 10, wherein the computer program product includes:

sub instructions for executing a program in the script by the script engine.

12. The computer program product of claim 10, wherein the agent automatically logs on to the instant messaging network and establishes a chat session with another agent without user intervention using the connection to the instant messaging system, wherein another script engine is located in the another agent.

13. The computer program product of claim 12, wherein the first instructions, the second instructions, and the third instructions are executed by the agent.

14. The method of claim 1, wherein the automatic programmatic communications is an exchange of messages between a plurality of computer programs without direct human intervention.

15. The method of claim 1, further comprising a step implemented by the data processing system of:

responsive to receiving a connection request from the management agent, determining whether the connection request is from a known entity for which connection requests are acceptable.

16. The data processing system of claim 6, wherein the automatic programmatic communications is an exchange of messages between a plurality of computer programs without direct human intervention.

17. The data processing system of claim 6, further comprising:

determining means, responsive to receiving a connection request from the management agent, for determining whether the connection request is from a known entity for which connection requests are acceptable.

18. The computer program product of claim 10, wherein the automatic programmatic communications is an exchange of messages between a plurality of computer programs without direct human intervention.

19. The computer program product of claim 10, further comprising:

instructions, responsive to receiving a connection request from the management agent, for determining whether the connection request is from a known entity for which connection requests are acceptable.

* * * * *